US009732652B2

(12) United States Patent
Fukui et al.

(10) Patent No.: US 9,732,652 B2
(45) Date of Patent: Aug. 15, 2017

(54) EXHAUST-GAS PURIFICATION DEVICE

(71) Applicant: YANMAR CO., LTD., Osaka-shi, Osaka (JP)

(72) Inventors: Yoshinori Fukui, Osaka (JP); Fumihiro Nishiura, Osaka (JP); Miwa Uchida, Osaka (JP); Tetsuya Yokoyama, Osaka (JP); Yasuyuki Takahata, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 15/028,336

(22) PCT Filed: Oct. 7, 2014

(86) PCT No.: PCT/JP2014/076778
§ 371 (c)(1),
(2) Date: Apr. 8, 2016

(87) PCT Pub. No.: WO2015/053256
PCT Pub. Date: Apr. 16, 2015

(65) Prior Publication Data
US 2016/0265407 A1   Sep. 15, 2016

(30) Foreign Application Priority Data
Oct. 9, 2013   (JP) ................. 2013-212235

(51) Int. Cl.
*F01N 3/00* (2006.01)
*F01N 3/20* (2006.01)
(Continued)

(52) U.S. Cl.
CPC ........ *F01N 3/2066* (2013.01); *B01F 3/04021* (2013.01); *B01F 5/0451* (2013.01);
(Continued)

(58) Field of Classification Search
USPC .......... 60/272, 286, 295, 297, 301, 303, 324
See application file for complete search history.

(56) References Cited

U.S. PATENT DOCUMENTS

| 6,449,947 B1 * | 9/2002 | Liu | B01D 53/9431 60/286 |
| 7,328,572 B2 * | 2/2008 | McKinley | F01N 3/2066 222/145.6 |

(Continued)

FOREIGN PATENT DOCUMENTS

| DE | 100 60 808 A1 | 7/2002 |
| DE | 102007012790 A1 | 9/2008 |

(Continued)

OTHER PUBLICATIONS

PCT/JP2014/076778, International Search Report dated Jan. 6, 2015, 4 pages.

(Continued)

*Primary Examiner* — Binh Q Tran
(74) *Attorney, Agent, or Firm* — Sterne, Kessler, Goldstein & Fox P.L.L.C.

(57) ABSTRACT

An exhaust-gas purification device includes an injection nozzle provided inside an exhaust pipe and a catalyst reactor provided on a downstream side of the injection nozzle, and is configured to inject urea water from the urea water injection nozzle into exhaust gas and to reduce nitrogen oxide in the exhaust gas by a NOx catalyst contained in the catalyst reactor, where the injection nozzle is disposed to inject the urea water toward the downstream side of the flow direction of the exhaust gas, and a mixer is connected to an upstream end of the catalyst reactor, the mixer having a plurality of plate members radially disposed around the axial center of the exhaust pipe, the plate members each being formed in such a way that angles of plate surfaces of the (Continued)

plate member to the flow direction are different values on the upstream side and the downstream side.

1 Claim, 6 Drawing Sheets

(51) Int. Cl.
  *F01N 3/28* (2006.01)
  *F01N 13/08* (2010.01)
  *B01F 5/04* (2006.01)
  *B01F 5/06* (2006.01)
  *B01F 3/04* (2006.01)

(52) U.S. Cl.
  CPC .......... *B01F 5/0616* (2013.01); *F01N 3/2892* (2013.01); *F01N 13/087* (2013.01); *B01F 2005/0637* (2013.01); *F01N 2240/20* (2013.01); *F01N 2240/36* (2013.01); *F01N 2410/00* (2013.01); *F01N 2590/02* (2013.01); *F01N 2610/02* (2013.01); *F01N 2610/1453* (2013.01); *F01N 2900/12* (2013.01); *F02D 2200/701* (2013.01); *Y02T 10/24* (2013.01)

(56) References Cited

U.S. PATENT DOCUMENTS

| | | | |
|---|---|---|---|
| 7,490,467 B2* | 2/2009 | Cummings | F01N 1/088 60/274 |
| 7,533,520 B2* | 5/2009 | Cheng | B01F 3/04049 60/274 |
| 8,141,353 B2* | 3/2012 | Zheng | B01F 3/04049 239/432 |
| 8,375,709 B2* | 2/2013 | Salanta | F01N 3/2066 60/317 |
| 9,410,464 B2* | 8/2016 | Hicks | F01N 3/2066 |
| 2008/0232190 A1 | 9/2008 | Schneider | |
| 2011/0016856 A1 | 1/2011 | Wirth | |
| 2013/0091830 A1 | 4/2013 | Li et al. | |
| 2013/0170973 A1 | 7/2013 | Staskowiak et al. | |

FOREIGN PATENT DOCUMENTS

| | | |
|---|---|---|
| JP | 2011-047293 A | 3/2011 |
| JP | 2011-106359 A | 6/2011 |
| JP | 2011-111927 A | 6/2011 |
| JP | 2012-135737 A | 7/2012 |
| JP | 2013-133805 A | 7/2013 |
| JP | 2013-231364 A | 11/2013 |
| WO | 2008/139942 A1 | 11/2008 |
| WO | WO 2011010850 A2 | 1/2011 |

OTHER PUBLICATIONS

Extended European Search Report issued in European Patent Application No. 14852164.4, dated May 30, 2017.

* cited by examiner

EXHAUST-GAS PURIFICATION DEVICE

TECHNICAL FIELD

The present invention relates to an exhaust-gas purification device of an engine. Particularly, it relates to an urea water injection nozzle of an exhaust-gas purification device for a ship.

BACKGROUND ART

Conventionally, there is known an exhaust-gas purification device for reducing, in order to reduce NOx (nitrogen oxide) contained in exhaust gas from a ship engine or the like, NOx to nitrogen and water by using a selective reduction type NOx catalyst (SCR catalyst) and a reduction agent. For example, there is one that reduces NOx to nitrogen and water by generating ammonia from urea water injected into high temperature exhaust gas and causing the same to come into contact with a NOx catalyst.

It is known to provide, to such an exhaust-gas purification device, a mixer for mixing exhaust gas and a reduction agent together, in order to increase the efficiency of reduction action of the NOx catalyst. The exhaust-gas purification device increases the efficiency of exhaust gas reduction action by supplying, to the NOx catalyst, exhaust gas which has been forcibly mixed with a reduction agent by the mixer. For example, description is given in JP-A 2011-47293.

However, with the exhaust-gas purification device described in JP-A 2011-47293, an additive agent injection valve (injection nozzle) has to be disposed in such a way that an additive agent that is injected from the additive agent injection valve directly collides with the mixer. That is, the position of the mixer of the exhaust-gas purification device described in JP-A 2011-47293 with respect to the additive agent injection valve is restricted. Accordingly, depending on the routing of the exhaust pipe of an internal combustion engine, there is a problem that the additive agent injection valve and the mixer of the exhaust-gas purification device cannot be installed at appropriate positions.

PRIOR ART DOCUMENT

Patent Document

Patent Document 1: JP-A 2011-47293

SUMMARY OF THE INVENTION

Problems to be Solved by the Invention

The present invention has been made to solve a problem as described above, and has its object to provide an exhaust-gas purification device in which an injection nozzle and a mixer may be disposed while simply maintaining a predetermined distance between the injection nozzle and the mixer, without being restricted by pipe routing from an engine to a catalyst reactor.

Solutions to the Problems

A problem to be solved by the present invention is as described above, and means for solving the problem will be described in the following.

That is, according to the present invention, an exhaust-gas purification device includes an injection nozzle that is provided inside an exhaust pipe of an engine and a catalyst reactor that is provided on a downstream side of the injection nozzle in a flow direction of exhaust gas, and is configured to inject a reduction agent from the injection nozzle into the exhaust gas of the engine and to reduce nitrogen oxide in the exhaust gas by a catalyst contained in the catalyst reactor, where the injection nozzle is disposed in such a way as to inject the reduction agent from an axial center of the exhaust pipe toward the downstream side of the flow direction of the exhaust gas, and where a mixer is connected to an upstream end of the catalyst reactor in the flow direction of the exhaust gas, the mixer having a plurality of plate members radially disposed around the axial center of the exhaust pipe, the plate members each being formed in such a way that an angle of an upstream end of the plate member to the flow direction of the exhaust gas and an angle of a downstream end of the plate member to the flow direction of the exhaust gas are different values.

According to the present invention, the plate members are each formed in such a way that the angle of the downstream end of the plate member to the flow direction of the exhaust gas is greater than the angle of the upstream end of the plate member to the flow direction of the exhaust gas, and a core member is provided at the axial center of the exhaust pipe where the plate members are close to one another, the core member having an end formed into a contracting tapered shape.

Effects of the Invention

The present invention is configured in the above manner, and achieves the following effects.

According to the present invention, a reduction agent that is uniformly injected into the exhaust pipe is uniformly mixed with exhaust gas by the mixer, and has no directionality with respect to the exhaust pipe. Therefore, the injection nozzle and the mixer may be disposed while simply maintaining a predetermined distance between the injection nozzle and the mixer, without being restricted by pipe routing from the engine to the catalyst reactor.

According to the present invention, the efficiency of mixing of a reduction agent and exhaust gas is increased. Accordingly, a pipe from the mixer to the catalyst reactor for securing a mixing time becomes unnecessary. Therefore, the injection nozzle and the mixer may be disposed while simply maintaining a predetermined distance between the injection nozzle and the mixer, without being restricted by pipe routing from the engine to the catalyst reactor.

EMBODIMENTS OF THE INVENTION

Figure 1:
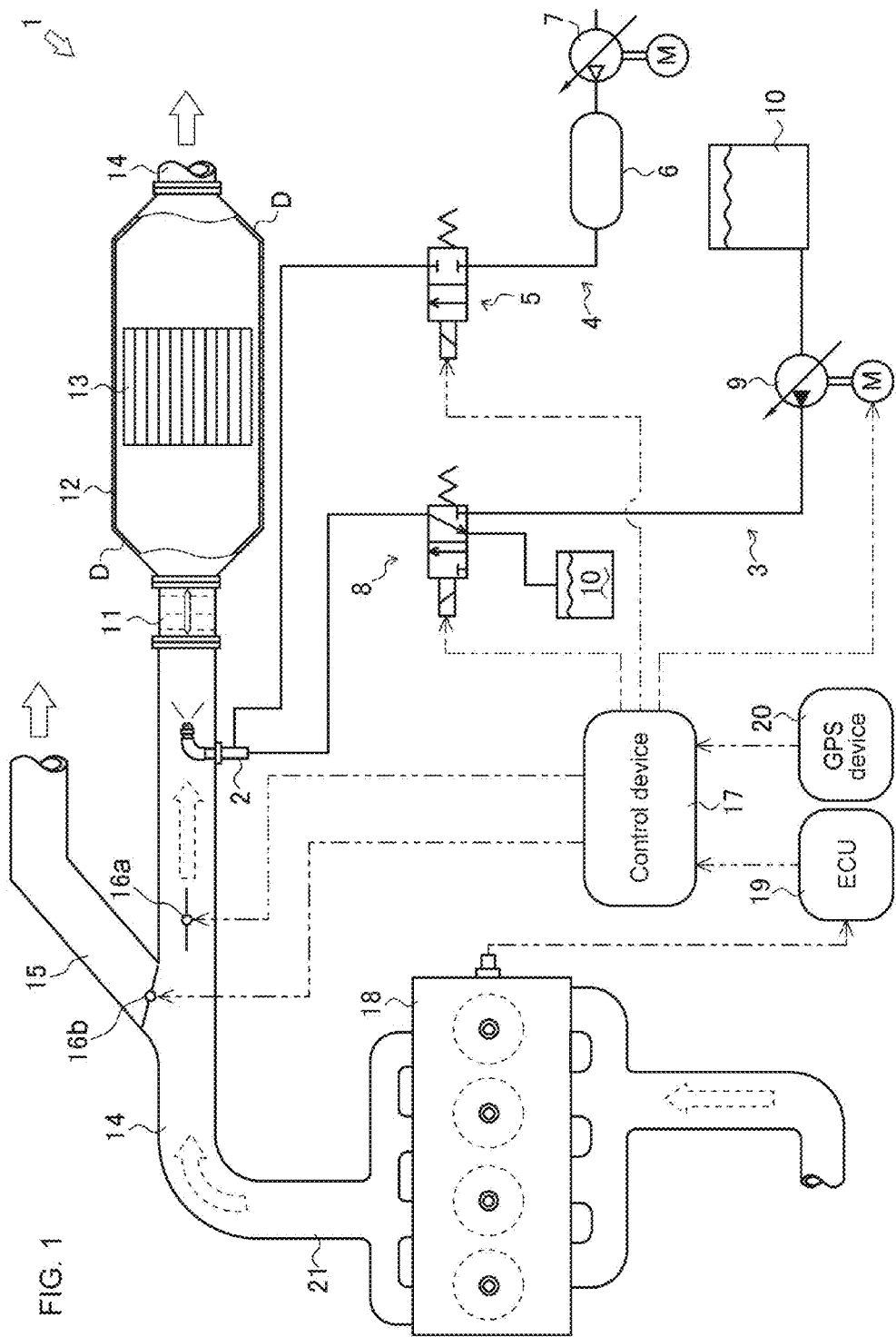
FIG. 1 is a schematic diagram showing an overall configuration of an exhaust-gas purification device according to the present invention.

Hereinafter, an exhaust-gas purification device 1, which is a first embodiment of an exhaust-gas purification device according to the present invention, will be described with reference to FIG. 1. Additionally, in the present embodiment, "upstream side" refers to the upstream side of the flow direction of exhaust gas, and "downstream side" refers to the downstream side of the flow direction of exhaust gas.

According to the present invention, an exhaust-gas purification device is provided to an engine, which is one internal combustion engine (for example, a main engine or an auxiliary engine of a ship engine), but this is not restrictive. In the case where a plurality of engines (such as auxiliary engines of a ship engine) are installed, exhaust gas from the plurality of engines may be collectively purified by one exhaust-gas purification device, or the exhaust-gas purification device may be provided for each engine.

The exhaust-gas purification device 1 purifies exhaust gas from an engine 18. The exhaust-gas purification device 1 includes an urea water injection nozzle 2, an urea supply channel 3, an air supply channel 4, a pressurized air valve 5, an air tank 6, a pressurized air supply pump (compressor) 7, a switching valve 8, an urea water supply pump 9, an urea water tank 10, a mixer 11, a catalyst reactor 12, a NOx catalyst 13, a control device 17, and the like. Additionally, the exhaust-gas purification device 1 uses urea water as a reduction agent, but this is not restrictive.

The urea water injection nozzle 2 serving as an injection nozzle for a reduction agent supplies urea water as a reduction agent into an exhaust pipe 14. The urea water injection nozzle 2 is formed by a tubular member, and its one side (on an injection port side) is provided inserted from the outside into the inside of the exhaust pipe 14 that is connected to the engine 18. The urea supply channel 3 serving as a channel for urea water is connected to the urea water injection nozzle 2. Also, the air supply channel 4 serving as a channel for pressurized air is connected to the urea water injection nozzle 2.

The urea water injection nozzle 2 is disposed to inject urea water from an axial center of the exhaust pipe 14 toward the downstream side. The urea water injection nozzle 2 injects the urea water from the axial center of the exhaust pipe 14 at an equal spreading angle with the injection port at the center. That is, the urea water injection nozzle 2 is configured to inject the urea water in a substantially conical manner with the injection port at the center.

The pressurized air valve 5 communicates or blocks the channel for pressurized air. The pressurized air valve 5 is provided to the air supply channel 4. The pressurized air valve 5 is configured from an electromagnetic valve, and a solenoid is connected to the control device 17. The pressurized air valve 5 is configured to be able to supply pressurized air pressurized into the air tank 6 by the pressurized air supply pump (compressor) 7 to the urea water injection nozzle 2 by sliding of a spool, not shown.

The switching valve 8 switches the channel of the urea water. The switching valve 8 is provided on the downstream side of the urea water supply pump 9 on the air supply channel 4. The switching valve 8 is configured to be able to supply the urea water in the urea water tank 10 to the urea water injection nozzle 2 by the urea water supply pump 9 by sliding of a spool, not shown.

The mixer 11 mixes exhaust gas and the urea water together. The mixer 11 is connected to the exhaust pipe 14, on the downstream side from the urea water injection nozzle 2 by a predetermined distance. The predetermined distance is a distance that is necessary for decomposition of urea water injected from the urea water injection nozzle 2 into ammonia inside the exhaust pipe 14. The mixer 11 includes four plate members 11b and a core member 11c provided inside a cylindrical housing 11a, which is formed to have the same inner diameter as the exhaust pipe 14. The mixer 11 is configured to cause the exhaust gas passing through the mixer 11 to swirl by the plate members 11b and the core member 11c (see FIG. 2). That is, the mixer 11 is configured in such a way that the exhaust gas at a center portion of the exhaust pipe 14 flows along an inner wall surface of the exhaust pipe 14.

The catalyst reactor 12 selectively reduces the NOx in the exhaust gas by the NOx catalyst 13 that is disposed inside the catalyst reactor 12. The catalyst reactor 12 is formed into a substantially cuboid shape whose one end and the other end are open. Also, a contracting tapered shape D is formed at the one end of the catalyst reactor 12. The mixer 11 is connected to the one end of the catalyst reactor 12. That is, the mixer 11 is disposed in close contact with the one (upstream-side) end of the catalyst reactor 12. A contracting tapered shape D is formed at the other end of the catalyst reactor 12. The exhaust pipe 14 is connected to the other end of the catalyst reactor 12.

The NOx catalyst 13 promotes reduction reaction of NOx. The NOx catalyst 13 is disposed inside the catalyst reactor 12. The NOx catalyst 13 promotes reaction of reduction of NOx contained in the exhaust gas to nitrogen and water by ammonia that is generated by thermal hydrolysis of urea water.

Now, description of the exhaust pipe 14 will be given. The exhaust pipe 14 is configured to discharge exhaust gas from the engine 18 to outside (atmosphere). The urea water injection nozzle 2, the mixer 11, and the catalyst reactor 12 of the exhaust-gas purification device 1 are provided to the exhaust pipe 14. Also, a branch pipe 15 and exhaust switching valves 16a, 16b for switching the passage of the exhaust gas are provided to the exhaust pipe 14, on the upstream side of the urea water injection nozzle 2. That is, the exhaust switching valves 16a, 16b, the urea water injection nozzle 2, and the mixer 11 are disposed to the exhaust pipe 14 in this order from the upstream side. The branch pipe 15 is connected to the exhaust pipe 14. The exhaust switching valve 16a is disposed inside the exhaust pipe 14, on the upstream side of the urea water injection nozzle 2 and the downstream side of the branch pipe 15. The exhaust switching valve 16b is disposed inside the branch pipe 15.

The exhaust switching valves 16a, 16b are configured to be able to open and close in coordination with each other. Specifically, the exhaust switching valves 16a, 16b are configured in such a way that, when the exhaust switching valve 16a is in an open state, the exhaust switching valve 16b is in a closed state, and when the exhaust switching valve 16a is in the closed state, the exhaust switching valve 16b is in the open state. Accordingly, in the case where the exhaust switching valve 16a is in the open state and the exhaust switching valve 16b is in the closed state, the exhaust pipe 14 forms a route by which the exhaust gas is supplied to the exhaust-gas purification device 1 (the state in FIG. 1). On the other hand, in the case where the exhaust switching valve 16a is in the closed state and the exhaust switching valve 16b is in the open state, the exhaust pipe 14 forms a route by which the exhaust gas is discharged to outside (atmosphere) through the branch pipe 15 without being purified by the exhaust-gas purification device 1. Additionally, the urea water injection nozzle 2, the exhaust switching valves 16a, 16b, and the mixer 11 may be disposed to the exhaust pipe 14 in this order from the upstream side. In this case, the exhaust switching valve 16b is controlled to close during injection of urea water.

Furthermore, as another embodiment, at a connection portion of the branch pipe 15, an exhaust switching valve for selectively placing one of the exhaust pipe 14 and the branch pipe 15 in a closed state may be provided at a connection portion of the branch pipe 15. In the case where the branch pipe 15 is in the closed state, the exhaust pipe 14 forms a route by which the exhaust gas is supplied to the exhaust-gas purification device 1. On the other hand, in the case where the exhaust pipe 14 is in the closed state, the exhaust pipe 14 forms a route by which the exhaust gas is discharged to outside (atmosphere) through the branch pipe 15 without being purified by the exhaust-gas purification device 1.

The control device 17 controls the pressurized air valve 5, the switching valve 8, the urea water supply pump 9, the exhaust switching valves 16a, 16b, and the like. Various programs and data for controlling the pressurized air valve 5, the switching valve 8, the urea water supply pump 9, the exhaust switching valves 16a, 16b, and the like, and an exhaust emission control area map M1 are stored in the control device 17. The control device 17 may be configured from a CPU, a ROM, a RAM, an HDD, and the like connected by a bus, or may be configured by a one-chip LDI or the like. Furthermore, the control device 17 may be configured integrally with an ECU 19 for controlling the engine 18.

The control device 17 is connected to each of the pressurized air valve 5, the switching valve 8, the urea water supply pump 9, the exhaust switching valves 16a, 16b, and the ECU 19. Furthermore, the control device 17 is connected to a GPS (Global Positioning System) device 20.

The control device 17 is capable of acquiring various pieces of information about the engine 18 from the ECU 19. The control device 17 is connected to the GPS (Global Positioning System) device 20, and is capable of acquiring the position detected by the GPS device 20. Furthermore, the control device 17 is capable of controlling each of the pressurized air valve 5, the urea water supply pump 9, the switching valve 8, and the exhaust switching valves 16a, 16b.

For example, in the case where the exhaust-gas purification device 1 configured in the above manner is mounted on a ship, the control device 17 acquires the current position of the ship detected by the GPS device 20, and determines whether the current position is in the exhaust emission control area, based on the control area map M1. In the case where the current position is determined to be in the exhaust emission control area, the control device 17 controls the exhaust switching valve 16a to be in the open state and the exhaust switching valve 16b to be in the closed state. That is, the exhaust gas is discharged to outside after it is purified by the exhaust-gas purification device 1. In the case where the current position is determined not to be in the exhaust emission control area, the control device 17 controls the exhaust switching valve 16a to be in the closed state and the exhaust switching valve 16b to be in the open state. That is, the exhaust gas is discharged to outside through the branch pipe 15 without being purified by the exhaust-gas purification device. Additionally, the control device 17 is also capable of acquiring open/close signals for the exhaust switching valves 16a, 16b based on manual operation, and of controlling the exhaust switching valves 16a, 16b according to the open/close signals.

Next, a structure of the mixer 11 will be specifically described with reference to FIGS. 2 to 4.

Figure 2:
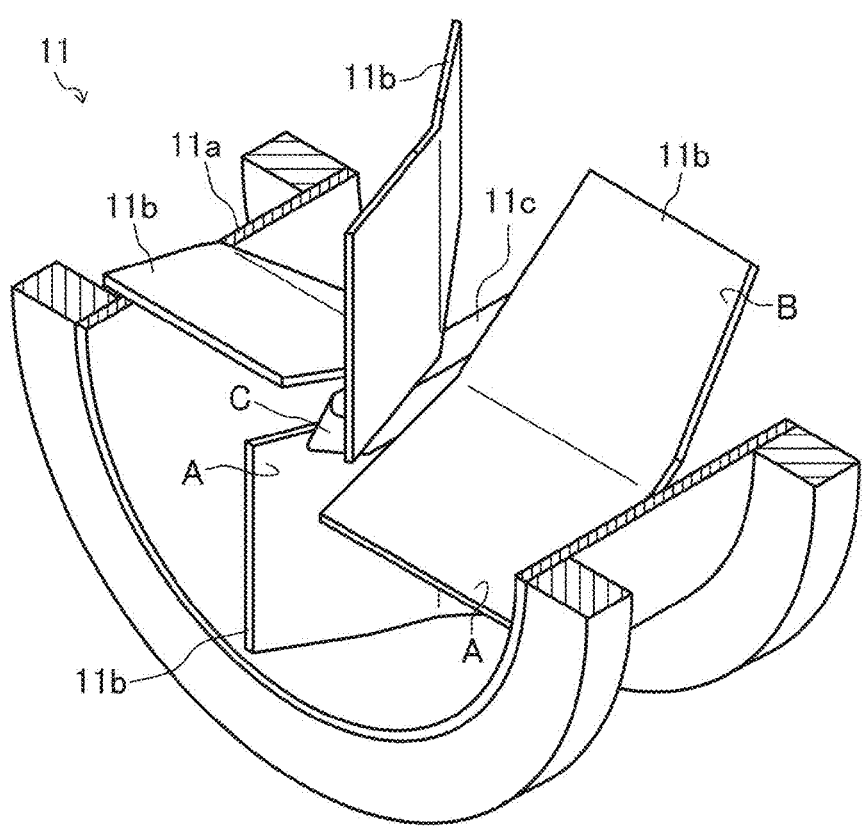
FIG. 2 is a perspective cross-sectional view showing the inside of a mixer of the exhaust-gas purification device according to the present invention.
Figure 3:
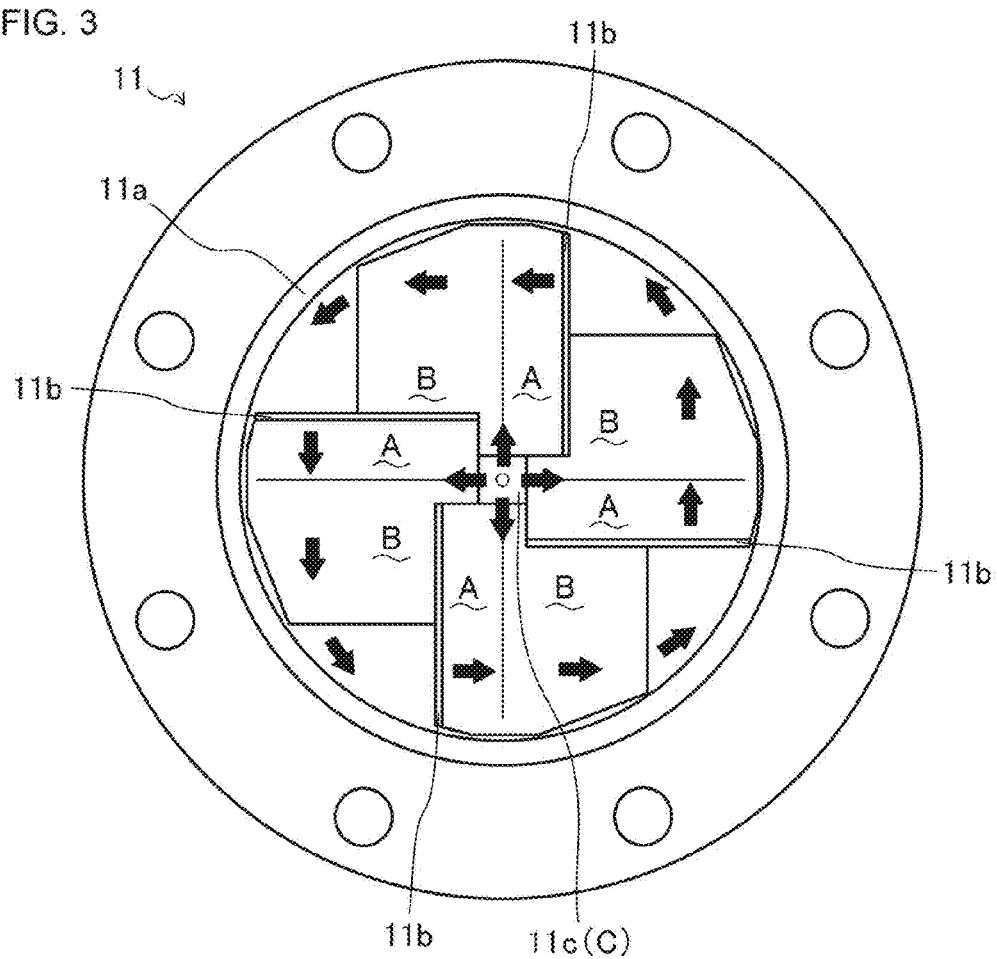
FIG. 3 is an upstream-side front view showing the mixer of the exhaust-gas purification device according to the present invention.
Figure 4:
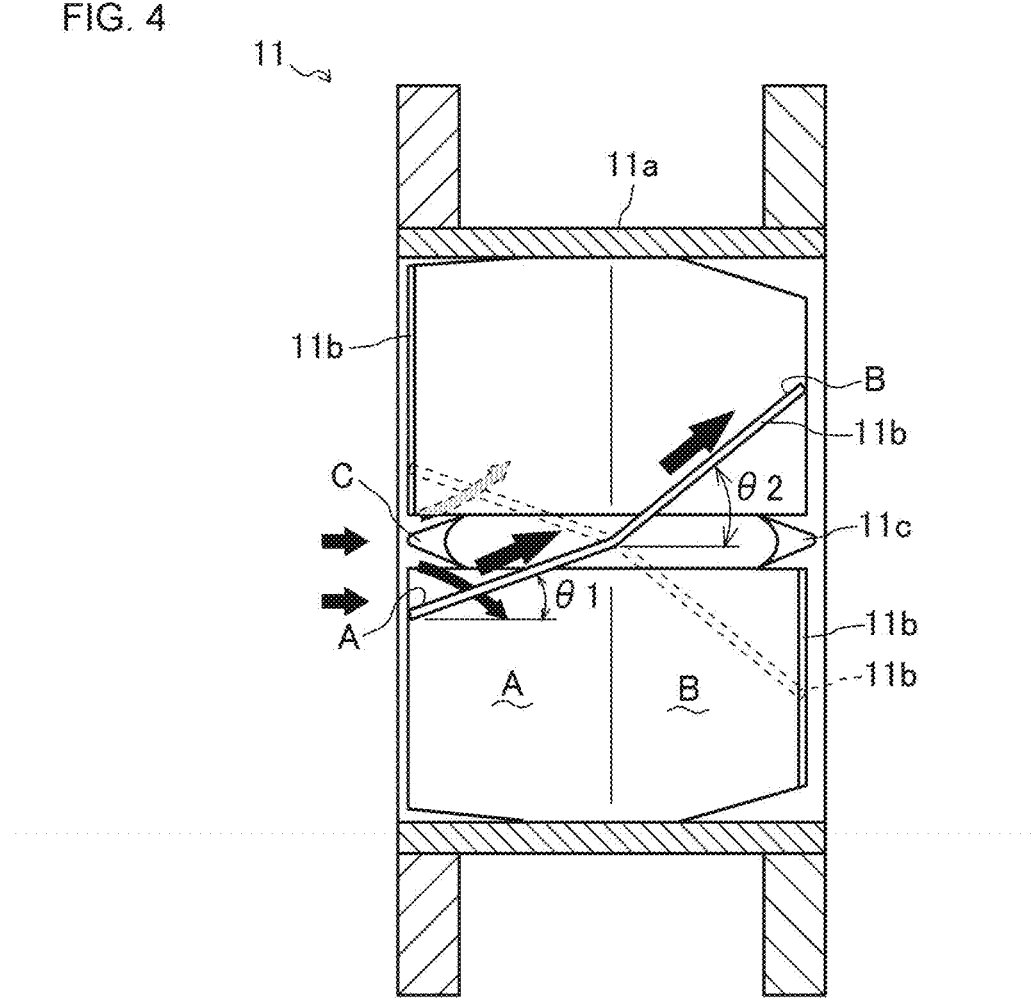
FIG. 4 is a cross-sectional side view showing the mixer of the exhaust-gas purification device according to the present invention.

As shown in FIGS. 2 to 4, the mixer 11 is configured from the housing 11a, the four plate members 11b, and the core member 11c.

The housing 11a is a main structural member of the mixer 11. The housing 11a is formed from a cylindrical member having substantially the same inner diameter as the exhaust pipe 14. The housing 11a has its upstream side connected to the exhaust pipe 14 with its axial center coinciding with the axial center of the exhaust pipe 14, and its downstream side connected to the one end of the catalyst reactor 12. That is, the housing 11a is connected to the exhaust pipe 14 to form a discharge passage.

The four plate members 11b are members for causing the flow of the exhaust gas to be swirl flow. The four plate members 11b are disposed inside the housing 11a, radially around the axial center of the housing 11a. Specifically, each of the four plate members 11b has its one end surface facing the axial center of the housing 11a, and the other end surface fixed to the inner side of the housing 11a. Here, the four plate members 11b are disposed at equal angles (in the present embodiment, 90 degrees) (see FIGS. 2 and 3). Additionally, in the present embodiment, the number of plate members 11b is four, but this is not restrictive.

The plate member 11b is disposed such that its upstream side and downstream side form respective predetermined angles with respect to the flow direction of the exhaust gas. That is, the plate member 11b is bent at a mid-portion. Specifically, the plate member 11b is bent in such a way that the angle of a plate surface A on the upstream side of the bent position with respect to the flow direction of the exhaust gas (hereinafter simply referred to as an "inclination angle") is an inclination angle □1, and the inclination angle of a plate surface B on the downstream side of the bent position is an inclination angle □2. Furthermore, the plate member 11b is bent in such a way that the inclination angle □2 is greater than the inclination angle □1. That is, the plate member 11b is formed to have the inclination angle become greater from the upstream side to the downstream side. Additionally, the plate member 11b may be formed with the middle part of the plate surface A and the plate surface B being bent in an arch.

The core member 11c occludes an axial center portion of the mixer 11. The core member 11c is formed to have a substantially bar shape. The core member 11c is disposed inside the housing 11a with its axial center coinciding with the axial center of the housing 11a. The one end surface of each of the four plate members 11b is fixed to a side surface of the core member 11c that is along the flow direction of the exhaust gas. That is, the core member 11c is fixedly supported by the four plate members 11b. Also, the four plate members 11b are fixed with respect to one another by the core member 11c.

A tapered shape C contracting toward the upstream side is formed at an upstream end of the core member 11c. Also, a tapered shape C contracting toward the downstream side is formed at a downstream end of the core member 11c. Specifically, the upstream end and the downstream end of the core member 11c are formed into conical shapes with their axial centers as the apexes. Accordingly, the core member 11c is configured to occlude the axial center portion of the mixer 11, and to guide the exhaust gas flowing into the axial center portion of the mixer 11 to the four plate members 11b disposed in the periphery (see black arrows in FIG. 4).

Figure 6:
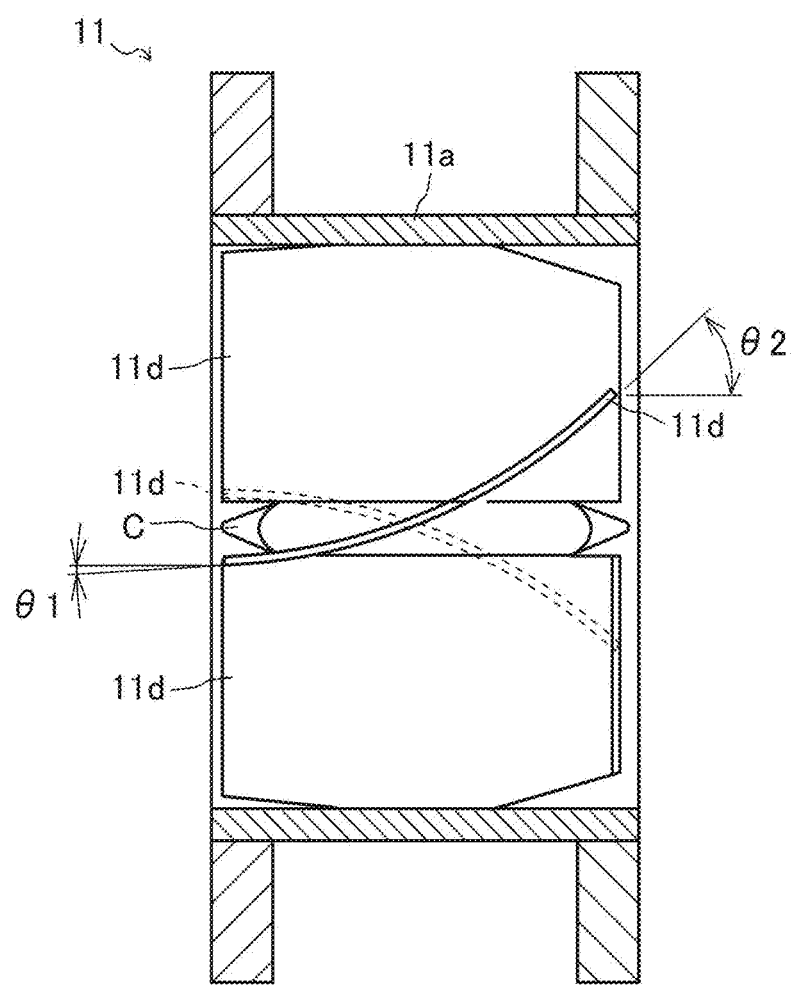
FIG. 6 is a cross-sectional side view showing a mixer according to another embodiment of the exhaust-gas purification device according to the present invention.

Furthermore, as another embodiment, the mixer 11 may be configured from plate members 11d which are formed in an arch shape, as shown in FIG. 6. Specifically, the mixer 11 is formed to change continuously (in an arch shape) from the inclination angle □1 on the upstream side to the inclination angle □2 on the downstream side. That is, the mixer 11 is configured in such a way that the inclination angle formed by the tangential direction of the plate surface of the plate member 11b formed in an arch shape and the flow direction of exhaust gas changes from the inclination angle □1 to the inclination angle □2 from the upstream side to the downstream side.

Next, a manner of mixing, by the mixer 11 and the catalyst reactor 12, of the urea water injected by the urea water injection nozzle 2 will be specifically described with reference to FIGS. 3 to 5.

Figure 5:
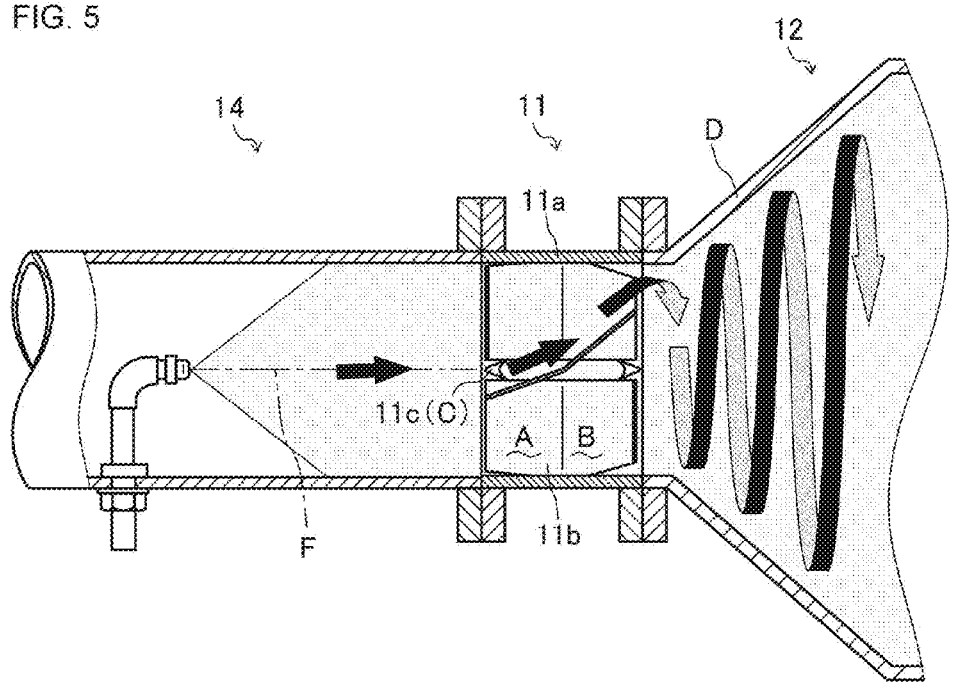
FIG. 5 is a cross-sectional side view showing a manner of flow of exhaust gas from the mixer to a catalyst reactor of the exhaust-gas purification device according to the present invention.

As shown in FIG. 5, the urea water injection nozzle 2 is disposed with the center of the injection port coinciding with an axial center F of the exhaust pipe 14. The urea water injection nozzle 2 injects urea water which has been turned into mist by the action of pressurized air, from the axial center of the exhaust pipe 14 into the exhaust pipe 14 in a conical manner. The urea water injection nozzle 2 disperses the urea water over the entire flow area of the exhaust gas with respect to a plane that is perpendicular to the flow direction of the exhaust gas inside the exhaust pipe 14. Accordingly, since the urea water injection nozzle 2 uniformly injects the urea water inside the exhaust pipe 14, there is no directionality with respect to the exhaust pipe 14. That is, such a disposition of the urea water injection nozzle 2 may suppress the influence of the routing of the exhaust pipe 14 on the dispersed state of the urea water.

The exhaust gas into which the urea water in the mist form has been injected is guided to the mixer 11 through the exhaust pipe 14. As shown in FIG. 3, the mixer 11 has a configuration according to which the structure formed from the plate members 11b and the core member 11c is point-symmetrical across the axial center when seen from the axial direction. That is, the mixer 11 mixes the exhaust gas passing through the entire flow area of the exhaust gas on the plane that is perpendicular to the flow direction of the exhaust gas inside the exhaust pipe 14. Accordingly, since the mixer 11 uniformly mixes the exhaust gas that is supplied from the exhaust pipe 14, it has no directionality with respect to the connected exhaust pipe 14. That is, with the mixer 11, its performance is not varied by the routing of the exhaust pipe 14, simply by maintaining a predetermined distance between the urea water injection nozzle 2 and the mixer 11.

As shown in FIGS. 3 to 5, the mixer 11 guides the exhaust gas by the plate surface A of the plate member 11b in such a way that the flow direction of the exhaust gas is along the plate surface A. That is, the mixer 11 changes the flow direction of the exhaust gas to the direction of the inclination angle □1. Furthermore, the mixer 11 guides the exhaust gas by the plate surface B of the plate member 11b in such a way that the flow direction of the exhaust gas is along the plate surface B. That is, the mixer 11 changes the flow direction of the exhaust gas to the direction of the inclination angle θ2. The exhaust gas thereby flows toward the inner surface of the housing 11a of the mixer 11, and moves in the circumferential direction of the inner surface of the housing 11a. As a result, the flow of the exhaust gas is made swirl flow, and the exhaust gas and the urea water are mixed together (see black arrows in FIG. 3).

According to the mixer 11, the resistance to the exhaust gas caused by the plate member 11b is reduced than in a case where the inclination angle of the plate member 11b is uniformly made the inclination angle θ2. Furthermore, according to the mixer 11, the swirl flow of the exhaust gas caused by the plate member 11b is greater than in a case where the inclination angle of the plate member 11b is uniformly made the inclination angle θ1. That is, the mixer 11 is capable of suppressing the resistance to the exhaust gas by the plate member 11b having different inclination angles on the upstream side and the downstream side, and also of increasing the swirl flow of the exhaust gas by the plate member 11b.

Furthermore, the mixer 11 guides the exhaust gas that is sent to the axial center portion of the mixer 11 to the plate member 11b by the tapered shape C at an end of the core member 11c. That is, the mixer 11 increases the mixing efficiency by guiding the exhaust gas at the axial center of the mixer 11, which is the center of the swirl flow, to the plate member 11b.

As shown in FIG. 5, the exhaust gas which has passed through the mixer 11 is supplied to the catalyst reactor 12 connected to the mixer 11 in a state of swirl flow. At the catalyst reactor 12, the swirl diameter of the swirl flow of the exhaust gas is increased by the tapered shape D that is formed at the one end. The exhaust gas is thereby uniformly mixed with the urea water, and is distributed across the NOx catalyst 13 disposed inside the catalyst reactor 12. Accordingly, there is no need to provide a space, between the mixer 11 and the catalyst reactor 12, for securing a mixing time for mixing the exhaust gas and the urea water together.

According to the exhaust-gas purification device 1 configured in the above manner, the exhaust gas and the urea water are mixed together without being affected by the routing of the exhaust pipe 14, by the urea water injection nozzle 2 being provided in such a way that the urea water is injected from the axial center of the exhaust pipe 14 at an equal spreading angle, and by provision of the mixer that is configured to be point-symmetrical across the axial center of the exhaust pipe 14. Furthermore, by changing the inclination angle of the plate member 11b or the mixer 11, and by disposing the core member 11c at the axial center portion, it is possible to efficiently and uniformly mix the exhaust gas and the urea water together. Moreover, because the one end of the catalyst reactor 12 is formed into the tapered shape D, a pipe from the mixer 11 to the catalyst reactor 12 for securing a mixing time becomes unnecessary. Accordingly, the urea water injection nozzle 2 and the mixer 11 may be disposed without being restricted by the routing of the exhaust pipe 14 from the engine 18 to the catalyst reactor 12.

INDUSTRIAL APPLICABILITY

The present invention may be used for an exhaust-gas purification device of an engine, and more particularly, it is applicable to an urea water injection nozzle of an exhaust-gas purification device for a ship.

DESCRIPTION OF REFERENCE SIGNS

1: Exhaust-gas purification device
2: Urea water injection nozzle
11: Mixer
11b: Plate member 12: Catalyst reactor
13: NOx catalyst
14: Exhaust pipe
18: Engine

What is claimed is:
1. An exhaust-gas purification device, comprising:
an injection nozzle that is provided inside an exhaust pipe of an engine, and a catalyst reactor that is provided on a downstream side of the injection nozzle in a flow direction of exhaust gas, the exhaust-gas purification device being configured to inject a reduction agent from the injection nozzle into the exhaust gas of the engine and to reduce nitrogen oxide in the exhaust gas by a catalyst contained in the catalyst reactor,
wherein the injection nozzle is disposed in such a way as to inject the reduction agent from an axial center of the exhaust pipe toward the downstream side of the flow direction of the exhaust gas,
wherein a mixer is connected to an upstream end of the catalyst reactor in the flow direction of the exhaust gas,
wherein the mixer comprises a plurality of plate members radially disposed around the axial center of the exhaust pipe,
wherein an upstream end of the plate member makes an inclination angle $\theta 1$ to the flow direction of the exhaust gas,
wherein a downstream end of the plate member makes an inclination angle $\theta 2$ larger than the inclination angle $\theta 1$ to the flow direction of the exhaust gas in a direction symmetrical to an inclination direction of the inclination angle $\theta 1$,
wherein the plate member is formed to change an inclination angle to the flow direction of the exhaust gas from the inclination angle $\theta 1$ to the inclination angle $\theta 2$ from an upstream side to the downstream side, and
wherein a core member is provided at the axial center of the exhaust pipe where the plurality of plate members are close to the core member having at least one end part formed into a contracting tapered shape.

* * * * *